(12) United States Patent
McGrath et al.

(10) Patent No.: US 6,283,247 B1
(45) Date of Patent: Sep. 4, 2001

(54) FABRIC RETAINER FOR ACOUSTIC STRUCTURE AND METHODS OF INSTALLATION

(75) Inventors: Ralph D. McGrath; Frank C. O'Brien-Bernini, both of Granville, OH (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 0 days.

(21) Appl. No.: 09/429,602

(22) Filed: Oct. 28, 1999

Related U.S. Application Data

(60) Provisional application No. 60/127,945, filed on Apr. 6, 1999.

(51) Int. Cl.[7] ..................................................... E04B 1/00
(52) U.S. Cl. .............................................. 181/295; 181/30
(58) Field of Search ........................... 181/295, 30, 287; 52/222, 273, 287

(56) References Cited

U.S. PATENT DOCUMENTS

| | | | |
|---|---|---|---|
| D. 315,960 | * | 4/1991 | Heidmann ........................... D25/138 |
| 2,081,765 | | 5/1937 | Prudden . |
| 2,710,335 | | 6/1955 | Wong . |
| 3,573,145 | * | 3/1971 | Witkosky et al. ..................... 161/41 |
| 3,712,846 | | 1/1973 | Daniels et al. . |
| 3,721,050 | | 3/1973 | Perina . |
| 3,934,382 | * | 1/1976 | Gartung ................................ 52/144 |
| 4,018,260 | * | 4/1977 | Baslow ............................... 160/327 |
| 4,197,923 | * | 4/1980 | Harris et al. ........................ 181/287 |
| 4,661,392 | | 4/1987 | Kapstad . |
| 4,788,806 | * | 12/1988 | Sease ..................................... 52/222 |
| 5,029,422 | | 7/1991 | Scherrer . |
| 5,117,598 | | 6/1992 | Livingston et al. . |
| 5,214,892 | | 6/1993 | Livingston et al. . |
| 5,230,377 | | 7/1993 | Berman . |
| 5,272,284 | * | 12/1993 | Schmanski ........................... 181/210 |
| 5,606,833 | | 3/1997 | Andersson . |
| 5,606,841 | | 3/1997 | Carter, Jr. . |
| 5,923,002 | | 7/1999 | McGrath et al. . |

FOREIGN PATENT DOCUMENTS

| | | |
|---|---|---|
| 23 03 639 A | 8/1974 | (DE) . |
| 2 051 914 A | 1/1981 | (GB) . |

\* cited by examiner

*Primary Examiner*—Robert E. Nappi
*Assistant Examiner*—Kim Lockett
(74) *Attorney, Agent, or Firm*—Inger H. Eckert; Stephen W. Barns

(57) ABSTRACT

Fabric retainers and methods for installing the fabric retainers within an acoustically treated room. The fabric retainers have a fabric retaining portion, and a chase or a raceway for running wires within the interior of the retainers. The chase has an open side which allows fasteners to be installed through the base of the retainer, and which allows for the insertion of wires into the chase. Retainers also have a retainer groove in which an acoustical fabric is secured, and a fabric retaining pocket to store the inserted fabric. Alternative retainer embodiments have two retainer grooves. A removeable cover is provided to secure the wiring within the chase, and to conceal the wiring within the chase. Also disclosed are methods for combining various retainer embodiments within a structure.

29 Claims, 14 Drawing Sheets

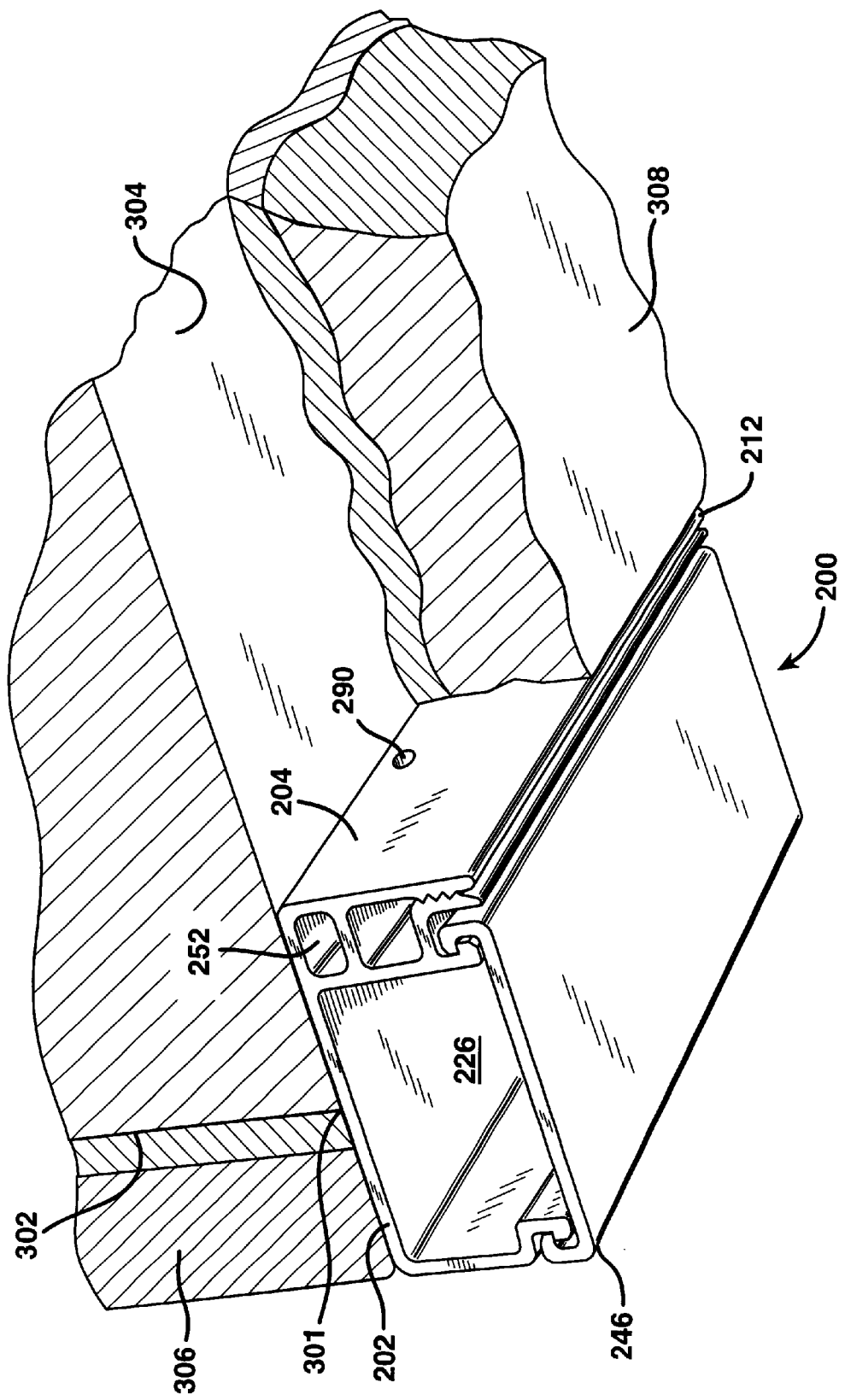

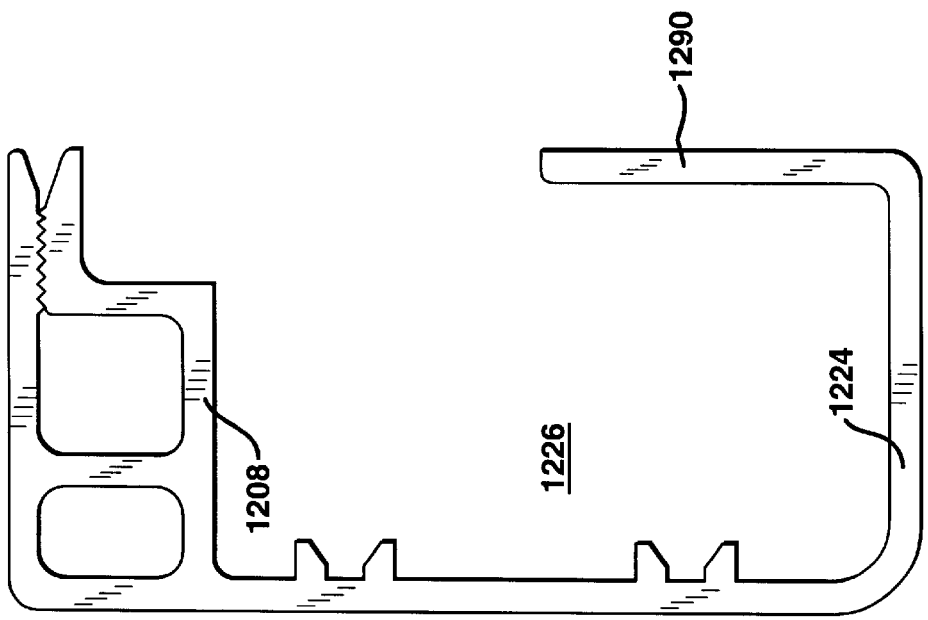
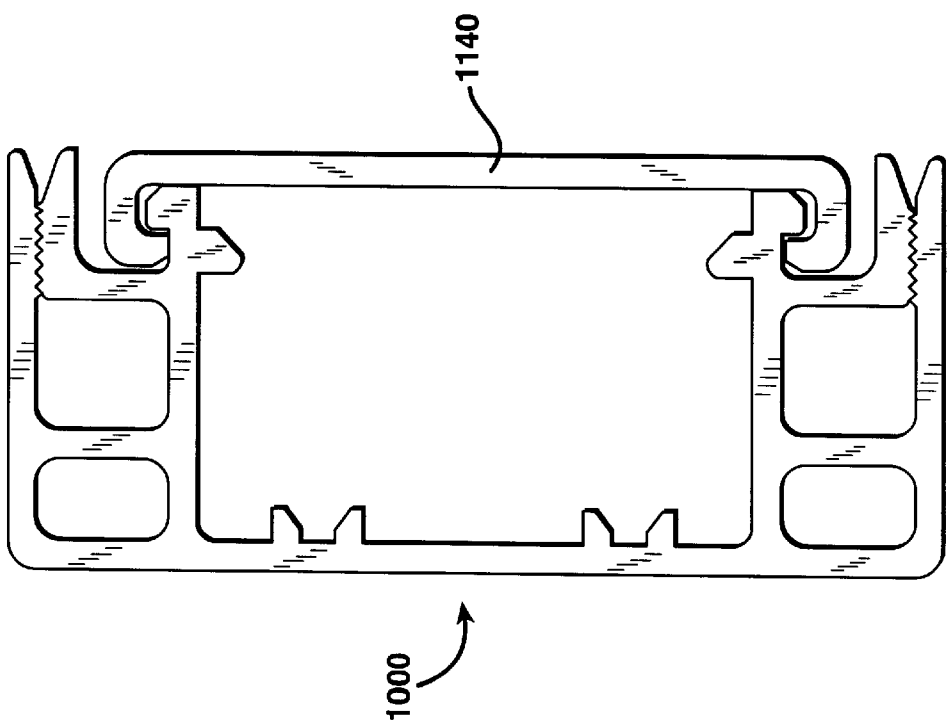

FABRIC RETAINER FOR ACOUSTIC STRUCTURE AND METHODS OF INSTALLATION

This application claims the benefit of U.S. Provisional Application No. 60/127,945, filed Apr. 6, 1999. This application is related to commonly owned U.S. patent application Ser. No. 08/969,132, now U.S. Pat. No. 5,923,002, the complete contents of which are herein incorporated by reference.

TECHNICAL FIELD AND INDUSTRIAL APPLICABILITY OF THE INVENTION

The present invention relates generally to acoustical treatments for rooms and the like in a structure. More particularly, a fabric retainer is disclosed which retains a fabric cover for covering acoustical material mounted on walls, ceilings, and the like, and which provides for the installation of wiring and cabling within the retainer. Mounting configurations for the various disclosed embodiments of retainers are also disclosed.

BACKGROUND OF THE INVENTION

Acoustical treatment of enclosed spaces has long been recognized as desirable. It is generally known that a room or the like may be acoustically treated, or "tuned" by selectively placing patterns of acoustical material on the interior walls. Tuning enhances or otherwise controls the sound quality within the room, such as the sound quality of a home theater system.

Arrangements of acoustical treatment generally include segments of acoustical material mounted on the walls, ceilings, or other surfaces of a room. The acoustical material may, for example, diffuse, selectively reflect, or absorb sound.

After the acoustical material is mounted, it is covered by a fabric. The fabric may be selected to enhance the aesthetic appeal of the room, such as by covering the acoustical material with fabrics of differing patterns and colors. In addition, the fabric keeps dirt and dust from collecting in the acoustical material.

The fabric is supported by retainer members having grooves in which the fabric edges are secured. Prior to covering the acoustical material with fabric, retainer members are mounted around the periphery of the pattern of acoustical material. A sheet of fabric is then placed over the acoustical material, and the edges of the fabric are tucked into the grooves in the retainer members, which secures the fabric over the acoustical material.

U.S. Pat. No. 5,923,002 to McGrath et al. discloses acoustical material in the form of paneling, and methods of installing the paneling. The acoustical paneling is mounted on wall surfaces to change room acoustics, and is covered by fabric material 100. The fabric material 100 is held within fabric retainers 96, as shown in FIG. 10 of McGrath et al.

FIGS. 17–19 of this application show conventional fabric retainers used in an acoustical treatment. The conventional retainer 10 in FIG. 17 has a fabric retainer groove 5 and a pocket 7 to store tucked fabric 8. The fabric retainer groove 5 is formed by opposed members 9, 11 having opposed rows of teeth 13, 15. It is difficult to tuck fabric into the fabric retainer groove 5 of this retainer because of the offset in height 18 between the two opposed members 9, 11. Fabric may only be tucked into the fabric retainer groove 5 from one side of the retainer- the side of the groove having the shorter of the two opposed members 9, 11. The direction of insertion is indicated generally by the arrow.

FIGS. 18 and 19 are cross-sectional and top views, respectively, of a conventional fabric retainer 20. Fabric retainer 20 has a fabric retainer groove 25 formed by opposed members 21, 29, and a pocket 27 for storing fabric. Fabric must be inserted into fabric retainer 20 in the direction generally indicated by the arrow.

Fabric retainers 10 and 20 do not allow for the insertion of wires, and any wires must be installed by some other means. This is inconvenient because acoustical treatment is often used in rooms which require additional wiring, such as speaker and control wires for a home theater system.

Therefore, a fabric retainer which can additionally act as a conduit or the like for wiring and the like is desirable. A fabric retainer which allows for the insertion of fabric from either side of the retainer groove is also desirable.

SUMMARY OF THE INVENTION

The fabric retainer and methods for installing retainers disclosed in this application overcome the above disadvantages and provide further advantages not contemplated by conventional devices.

The present invention is therefore directed to a fabric retainer that supports fabric in a fabric retaining portion. In addition to the fabric retaining portion, the fabric retainer has a chase in which wires, cables, and the like can be run. The present invention allows for acoustical materials mounted in a structure to be quickly and easily concealed, and for wiring to be contained in the retainer without the need for additional wiring conduits.

The present invention is also directed to the use of different types of fabric retainers within a single system of fabric retainers. Fabric retainer types are selected and installed in certain parts of a room according to their specific characteristics.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 is a partial perspective view illustrating a retainer according to the present invention in an acoustical treatment system for a preexisting wall;

FIG. 11 is a cross-sectional view of a fabric retainer according to the present invention having two fabric retaining portions and a plain removable face cover;

FIG. 12 is a cross-sectional view of a fabric retainer according a sixth embodiment of the present invention;

It is expressly noted that the drawings appended hereto are meant to be illustrative only, and are not to be construed as limiting the invention. The appended drawings are not necessarily drawn to a consistent scale within a drawing or amongst the drawings.

DETAILED DESCRIPTION AND PREFERRED EMBODIMENTS OF THE INVENTION

Figure 1:
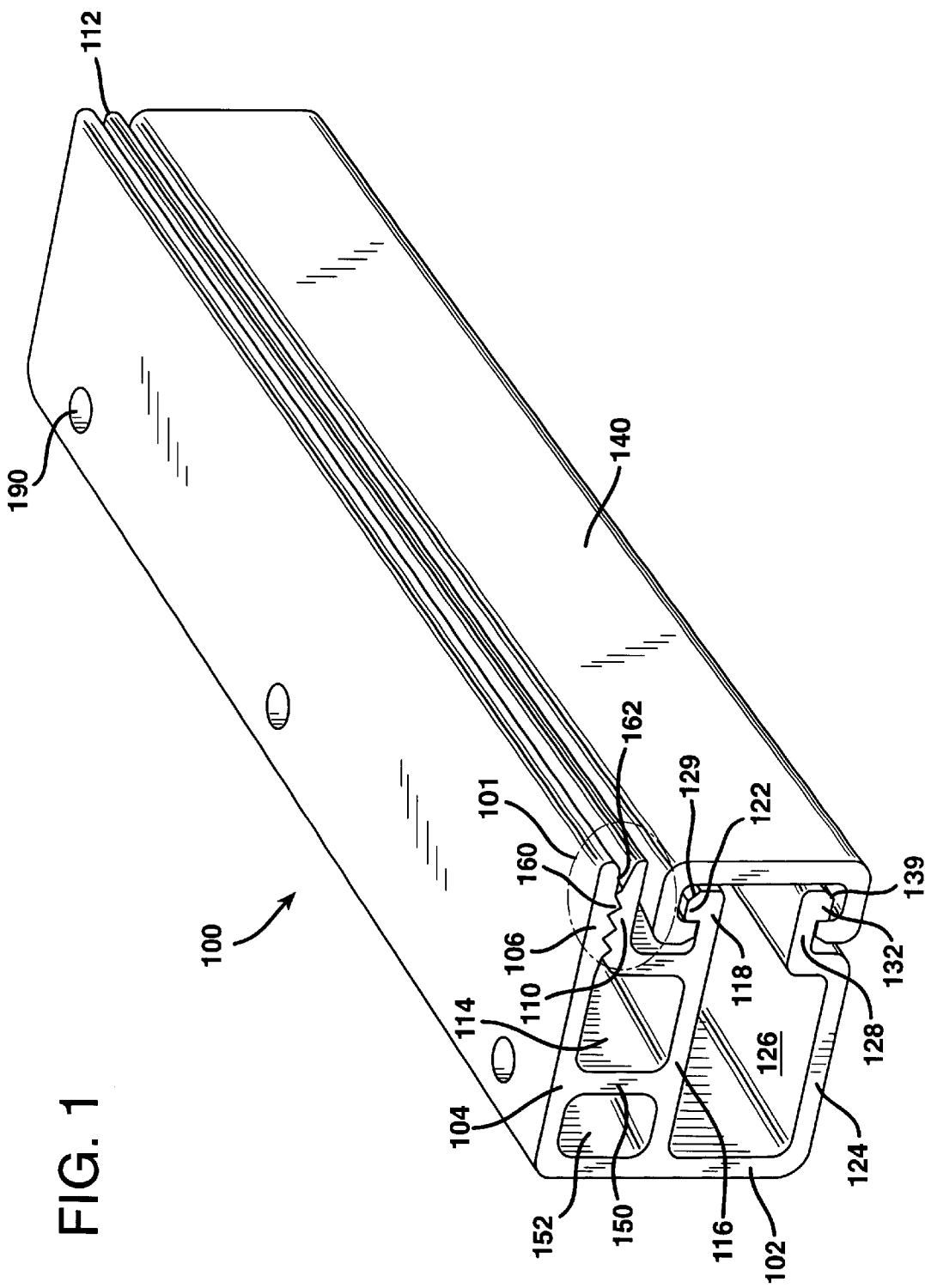
FIG. 1 is a perspective view of a fabric retainer according to a first embodiment of the present invention.
Figure 6:
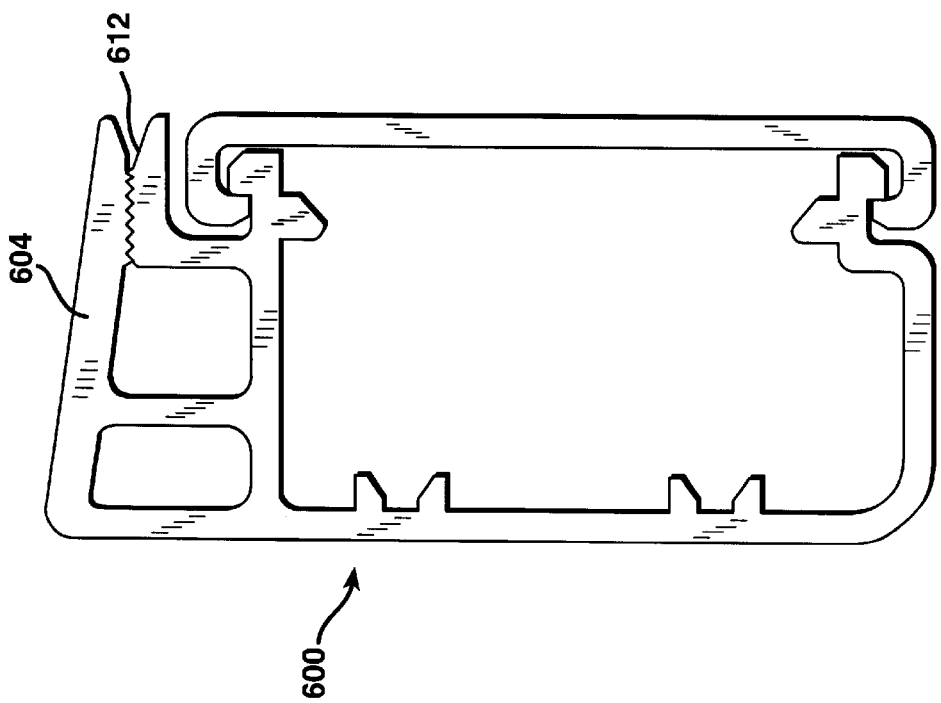
FIG. 6 is a cross-sectional view of a fabric retainer according to a fourth embodiment of the present invention.

FIG. 1 is a perspective view of a fabric retainer according to a first embodiment of the present invention. The fabric retainer 100 is shown as an elongated member having a base wall 102. Base wall 102 has an exterior surface which may be attached to a support wall or structure. A first wall 104 extends from the base wall 102, and an end portion 106 of the first wall 104 forms a part of a fabric retaining portion 101 of the fabric retainer 100. In this embodiment, the first wall 104 extends orthogonally to base wall 102. In alternative embodiments, the first wall 104 may be sloped, as seen in FIG. 6.

An interior wall 116 extends from the base wall 102 and terminates in a forked end. One branch of the fork is a fabric retaining arm 110, which forms part of the fabric retaining portion 101. Therefore, fabric retaining portion 101 includes the end portion 106 of the first wall 104 and the opposed fabric retaining arm 110. A retainer groove 112 is defined by the end portion 106 and the retaining arm 110, and permits insertion of a fabric edge into a fabric storage pocket 114, which is generally located between the first wall 104 and the interior wall 116. Once fabric is inserted through the retainer groove 112, it is gathered and retained within the fabric storage pocket 114.

The end portion 106 and the fabric retaining arm 110 are provided with opposed fabric retaining surfaces 160 and 162, respectively. The fabric retaining surfaces 160, 162 can be formed by, for example, rows or sets of teeth. Teeth 160, 162 are shown in FIG. 1 as merely one example of opposed retaining surfaces for the end portion 106 and fabric retaining arm 110. Parallel rows of pointed retaining teeth, a roughening or scoring of the surfaces of the end portion 106 and the fabric retaining arm 110, and pointed or spiked elements on the end portion 106 and the fabric retaining arm 110 are all also considered suitable methods for retaining fabric within the retainer groove 112. The end portion 106 and the fabric retaining arm 110 may be resiliently biased against one another at their respective retaining surfaces, or a small gap may be left for easy insertion of fabric into the retainer groove 112. The spacing between the fabric retaining surfaces 160, 162 depends on the gauge of the fabric and the desired strength with which the fabric is retained in the retainer 112.

Locking portion 118 forms the second branch of the forked end of the interior wall 116. The locking portion 118 extends from the forked end of the interior wall 116, and includes a locking lip 122 which extends from a side of the locking portion 118. Locking portion 118 cooperates with a locking portion 128 to engage a removable face cover 140, as will be discussed below with reference to this embodiment.

A second wall 124 extends from the base wall 102 and is spaced away from the first wall 104. A chase 126 is defined between the interior wall 116 and the second wall 124. The second wall 124 terminates in the locking portion 128, which includes a locking lip 132 extending from a side of the locking portion 128. The locking portion 128 is preferably, but not necessarily, similar in construction to the locking portion 118 of the interior wall 116. The space between locking portions 118 and 128 defines an opening to the chase 126 through which wire, cabling, or any other communication, speaker, and/or power lines can be placed in the chase 126.

The interior wall 116 generally divides the fabric retainer 100 into the chase 126 and the fabric storage pocket 114. The interior of fabric retainer 100 is further divided by a box rib 150 which extends laterally from the interior wall 116 to the first wall 104, thus defining a box section 152. Wiring can be routed from the interior of the chase 126, through the first wall 104, without interfering with fabric stored within the fabric storage pocket 114.

In order to create a path between the exterior of the retainer and the chase 126, one or more ports 190 may be formed in the first wall 104 and in the interior wall 116. Wiring may then be fed into or out of the chase 126 from the exterior of the fabric retainer 100, for interface with speakers, junction boxes, and the like. The ports 190 may be formed as needed during installation, or the fabric retainer 100 may be manufactured so as to already include one or more ports 190 in the first wall 104 and/or the interior wall 116. Also, one or more partial outlines of ports 190 may be stamped or cut into the first wall 104 and the interior wall 116. These outlines, or "knockouts," can be selectively removed to define ports 190.

Box section 152 separates wiring from the fabric within the fabric storage pocket 114, and also protects the wiring from a fabric insertion tool. Fabric is typically inserted into the fabric storage pocket 114 using an insertion tool resembling a pizza cutter or a spreader (which is frequently relatively sharp). The box rib 150 prevents the insertion tool from engaging wiring within box section 152. Also, ports 190 can be drilled after the fabric is inserted without damaging the fabric. While the box rib 150 is shown as extending perpendicularly to the interior wall 116 and the first wall 104, it may be disposed at an angle.

The box section 152 also increases the stiffness of the fabric retainer 100. The increased stiffness helps the retaining portion 101 maintain a secure grip on fabric inserted into retainer groove 112. Further, the increased stiffness of the fabric retainer 100 helps ensure that the retainer 100 remains relatively straight during installation.

The primary access to the chase 126 is provided by its open side located between the locking portions 118 and 128. To cover the open side of the chase, the removable face cover 140 may be engaged with the locking portions 118, 128. In FIG. 1, the removable face cover 140 is an elongated generally flat element which can engaged with respective locking portions 118, 128 to close the open side of the chase 126. The removable face cover 140 securely retains wiring located in the chase 126, and conceals the wiring from view. Locking lips 122 and 132 both preferably, but not necessarily, have chamfered surfaces 129, 139, respectively, to facilitate engagement of the removable face cover 140 with the locking portions 118, 128.

The open side of the chase 126 also facilitates mounting of the fabric retainer 100 onto a support surface, such as an underlying wall. A screw, a nail, or other fastener can be positioned through the opening of the chase 126 and driven through the base wall 102. A stapler may also be positioned through the opening of chase 126 so that the fabric retainer 100 can be stapled to a support surface. Alternatively, the fabric retainer 100 can be secured to a support surface by an adhesive, such as "LIQUID NAILS" adhesive.

Figure 2:
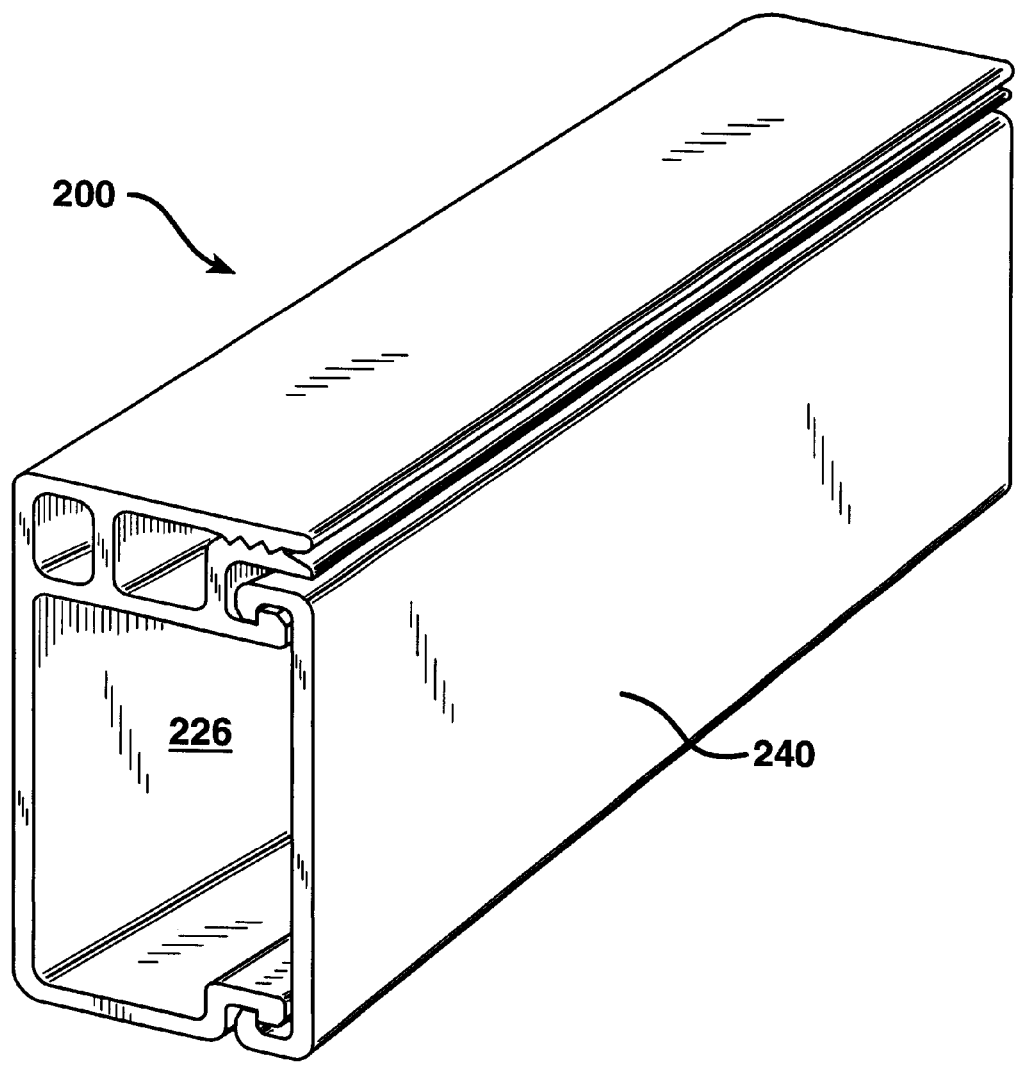
FIG. 2 is a perspective view of a fabric retainer according to a second embodiment of the present invention.

FIG. 2 is a perspective view of a fabric retainer according to a second embodiment of the present invention. Fabric retainer 200 has a chase 226 which is larger than that of chase 126 in fabric retainer 100. The larger chase 226 allows more wiring to be installed in fabric retainer 200, and facilitates installation. This embodiment of the fabric retainer may be used in combination with the fabric retainer 100 having a smaller chase, in order to accommodate various wiring arrangements within a room. The larger chase 226 requires a correspondingly larger face cover 240.

FIG. 3 shows the fabric retainer 200 mounted on an exterior corner 301 of walls 302 and 304 onto which acoustical material portions 306 and 308, respectively, have been applied. Retainer 200 is used by way of example in this figure, but any of the fabric retainer embodiments disclosed in this application may be used in this fashion. In the figure, the base wall 202 is mounted against the wall 304. This configuration shows a corner mount where acoustical material 306 is disposed along a portion of the base wall 202, and acoustical material 308 is disposed along the first wall 204.

Varying thicknesses of acoustical material 306 can be accommodated according to the extent that base wall 202 extends over the corner 301. A fabric retainer having a larger chase is desirable because it allows for a greater range of material thicknesses than a fabric retainer having a smaller chase. If a greater thickness of acoustical material 308 is desired, a fabric retainer 200 having first wall 204 and second wall 224 which extend further from base wall 202 could be used. In this mounting configuration, fabric is tucked into the retainer groove 212, stretched over rounded corner 246 of the removable face cover 240, and inserted into the retainer groove of a fabric retainer (not shown) mounted on the adjacent wall 302. Box section 252 provides for insertion or removal of wires from the chase to the exterior side of first wall 204, such as through ports 290.

Note that the fabric retainer 200 is particularly suited for use as a base disposed along a floor, or a top retainer used along a ceiling or other hard-to-reach area. The larger chase 226 facilitates using fasteners and provides more space for wiring. The larger chase also provides more area for attaching the fabric retainer to the wall with fasteners driven through the base wall 202. This is especially useful in the corner embodiment as shown in FIG. 3, because a degree of overhang of the base wall 202 can be selected to accommodate the thickness of acoustical material 306.

Figure 4:
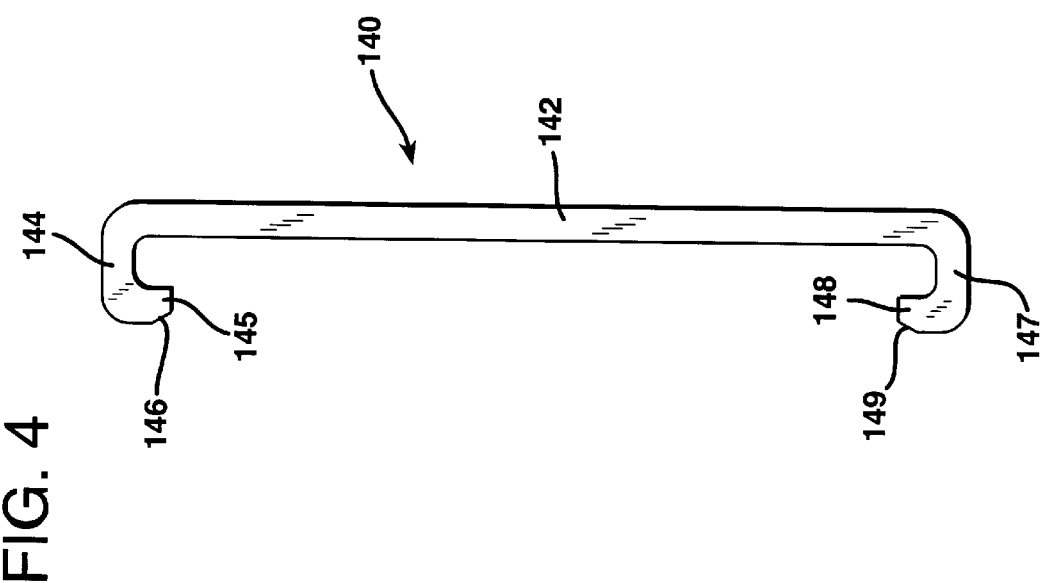
FIG. 4 is a cross-sectional view of a face cover according to the present invention.

FIG. 4 is a cross-sectional view of a removable face cover according to the present invention. Removable face cover 140 includes a generally flat face section 142, a leg 144 extending perpendicularly to the face section, and an inwardly facing locking lip 145 curving inwardly from a side of the leg 144. The opposite edge of the face section includes a leg 147 and an inwardly facing locking lip 148. Engagement edges of the locking lips may be chamfered at 146, 149 so that the face cover 140 can be easily engaged with the locking portions of a fabric retainer as discussed above. The removable face cover 140 is installed on the fabric retainer 100, for example, by placing the face cover 140 over the open side of the chase of the fabric retainer 100, and pressing the face cover 140 until the locking lips 145, 148 engage corresponding locking lips 122, 132, as shown in FIG. 1.

Figure 5:
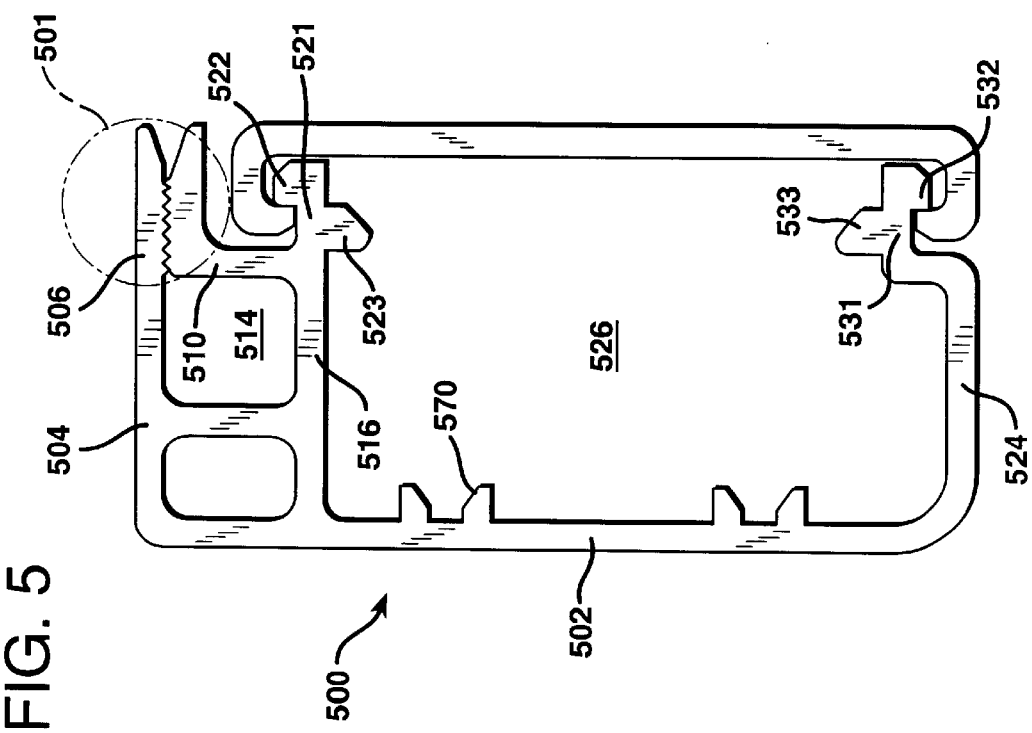
FIG. 5 is a cross-sectional view of a fabric retainer according to a third embodiment of the present invention.

FIG. 5 is a cross-sectional view of a third embodiment of a fabric retainer having two-way locking portions 521, 531. Retainer 500 includes a first wall 504, an interior wall 516, and a second wall 524 which project perpendicularly from a base wall 502. Fabric retaining portion 501 includes an end portion 506 of first wall 504 and a fabric retaining arm 510, and secures fabric which has been inserted into fabric storage pocket 514. Two-way locking portion 521 forms one branch of a forked end of interior wall 516, and two way locking portion 531 is located at an end portion of second wall 524. Two-way locking portion 521 has locking lips 522 and 523 disposed on opposite sides of the locking portion 521, and two-way locking portion 531 has locking lips 532 and 533 disposed on opposite sides of the locking portion 531. The inclusion of two-way locking portions on the interior wall 516 and on the second wall 524 allows for the attachment of removable face covers having differing locking configurations as discussed further below.

Fastener locators 570 are shown within the chase 526. The fastener locators 570 can be in the form of a continuous ridge along the length of the base wall 502, or, they may include a series of circular cup-shaped protrusions formed at spaced intervals on the base wall 502. The fastener locators 570 allow for easy location of fasteners such as screws, nails etc. These locators are also suitable for use in the fabric retainer embodiments shown in FIGS. 1 and 2.

FIG. 6 is a cross-sectional view of a fourth embodiment of a fabric retainer having an inwardly sloping first wall 604 to allow for clearance between the first wall 604 and any surface abutting or nearly abutting the first wall 604. This allows the fabric retainer 600 to be mounted into an interior corner, such as at a ceiling, with the first wall 604 directly opposed to a wall surface (e.g. a ceiling). The first wall 604 may then deflect outwardly upon the insertion of fabric into the retainer groove 612, without interfering with the wall. The installation of fabric retainers into interior corners will be discussed with reference to FIG. 13.

Figure 7:
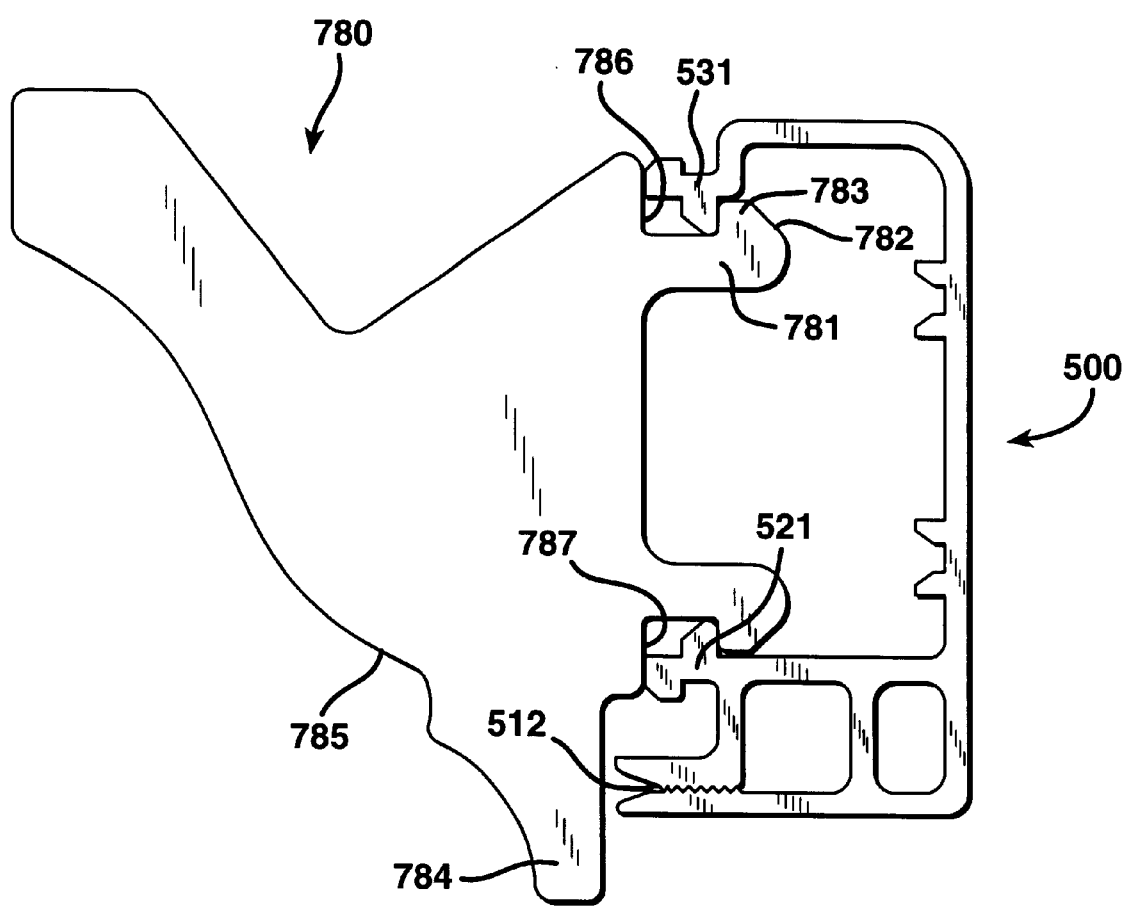
FIG. 7 is a cross-sectional view of a fabric retainer according to the present invention in which the removable face cover is a crown molding.

FIG. 7 is a cross-sectional view of fabric retainer 500 having another removable face cover. Crown molding face cover 780 is engaged with two-way locking portions 521, 531 on fabric retainer 500. The crown molding face cover 780 includes locking projections 781, for example, with rounded or chamfered insertion surfaces 782 terminating in locking lips 783. A rounded or chamfered surface 782 facilitates engagement against the chamfers of the locking lips of two-way locking portions 521, 531, but are not required according to the present invention. Crown molding face cover 780 provides an aesthetically pleasing appearance to the retainer when it is disposed around an elevated part of a wall, such as in the vicinity of the ceiling of a room, or any elevated portion of a support surface. The face 785 of the crown molding face cover can have any decorative or relief configuration. An edge 784 of the face cover 780 extends past the retainer groove 512 to conceal the point at which fabric is tucked into the retainer groove 512.

While the fabric retainer 500 is shown as supporting the crown molding face cover 780, any of the disclosed retainer embodiments having locking lips which project towards the chase opening can support a crown molding face cover as shown in FIG. 7. Likewise, the projections 781 could be reversed and could engage locking lips which project outwardly away from the open side of the chase, as shown in FIG. 1. The crown molding face cover 780 is securely held by the action of the locking lips 783, and by the abutting surfaces 786 and 787 which engage end surfaces of the two-way locking portions 521 and 531. The locking projections 781 need not be continuous along the face cover 780, but may be discrete, longitudinally spaced locking clips formed on the face cover 780.

Figure 8:
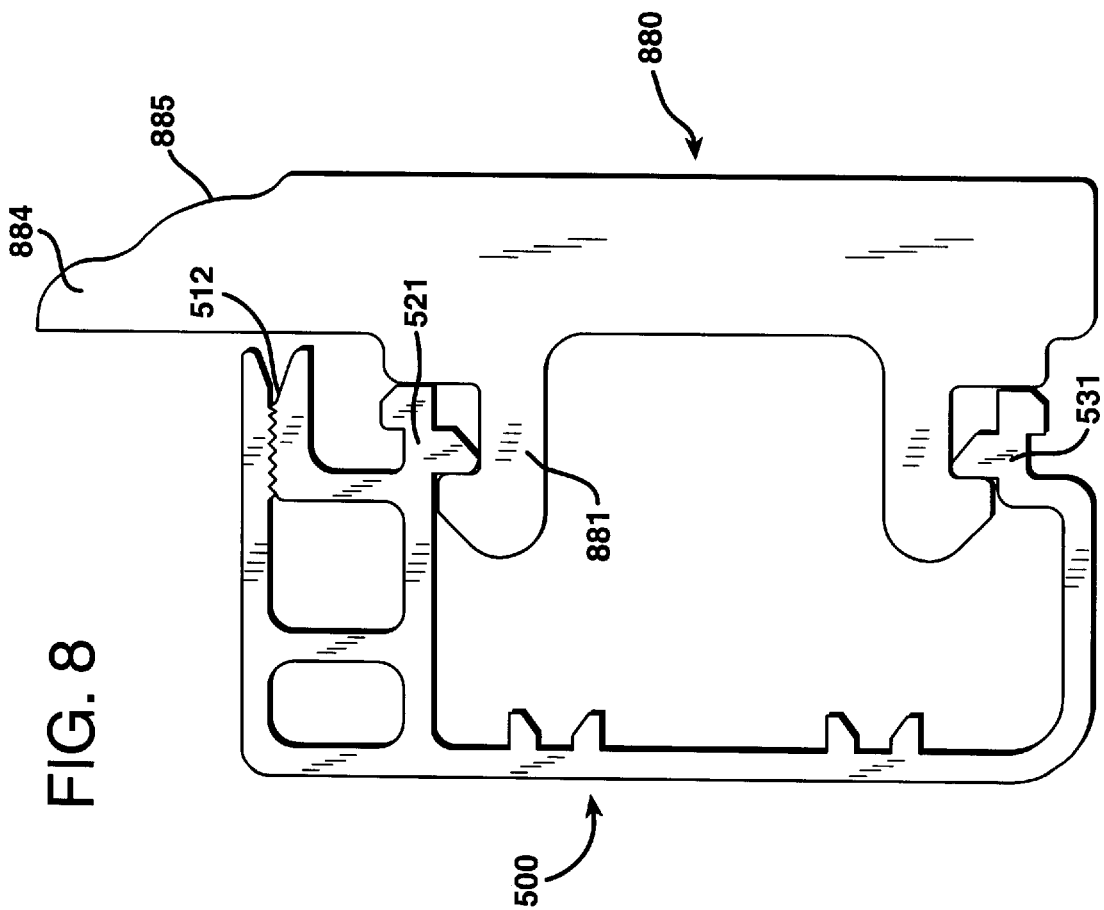
FIG. 8 is a cross-sectional view of a fabric retainer according to the present invention in which the removable face cover is a baseboard molding.

FIG. 8 is a cross-sectional view of the fabric retainer 500 having another removable face cover. Baseboard face cover 880 is engaged with two-way locking portions 521, 531 on fabric retainer 500. The baseboard face cover 880 includes a decorative portion 884 that extends past and conceals retainer groove 512. The face 885 of the baseboard face cover 880 can have any decorative cross-section desired, and may have any desired thickness or height. Similar to the locking projections 781 shown in FIG. 7, locking projections 881 extend from the baseboard face cover 880 to engage two-way locking portions 521 and 531 of the fabric retainer 500. The locking projections 881 may also be reversed to engage oppositely oriented locking lips on the two-way locking portions 521 and 531. Further, the locking projections 881 need not be continuous along the base plate 880, but may be discrete, longitudinally spaced locking clips formed on the face cover 880.

Figure 9:
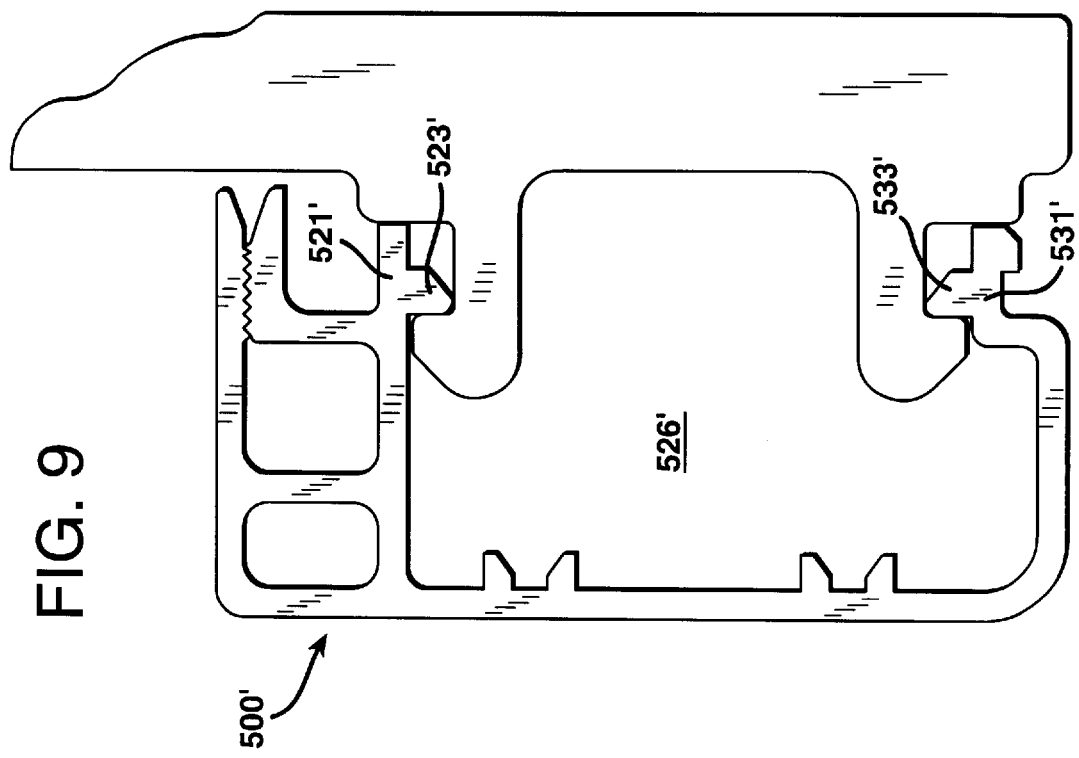
FIG. 9 is a cross-sectional view of a variant of the fabric retainer illustrated in FIG. 8.

FIG. 9 is a cross-sectional view of a variant of the fabric retainer shown in FIG. 8. Locking portions 521', 531' of fabric retainer 500' include only locking lips 523' and 533' respectively, which extend towards a chase 526'.

Figure 10:
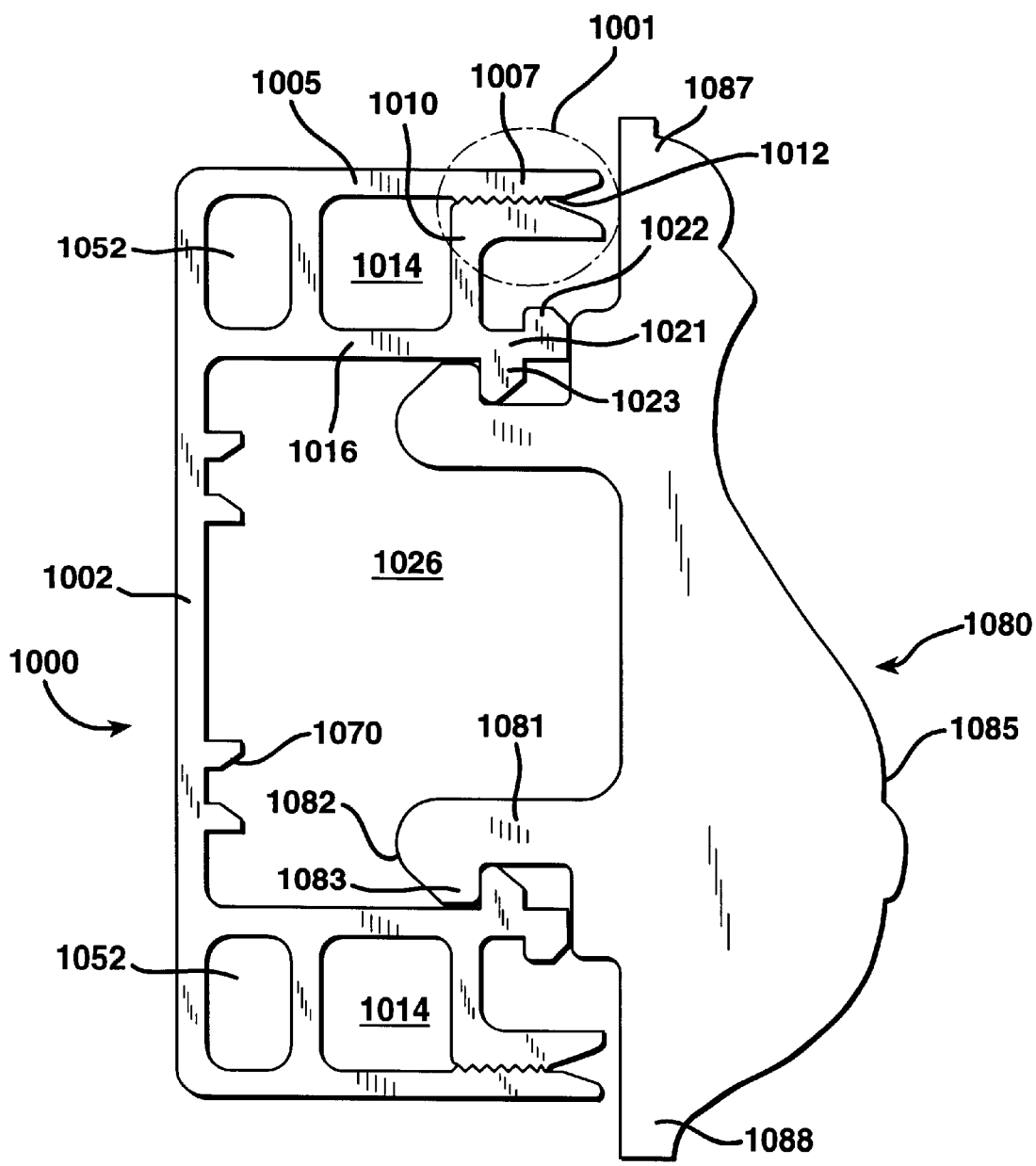
FIG. 10 is a cross-sectional view of a fabric retainer according to a fifth embodiment of the present invention having two fabric retaining portions and a chair molding removable face cover.

FIG. 10 is a cross-sectional view of a fifth embodiment of the present invention. Fabric retainer 1000 has two separate fabric retaining portions 1001, each having a retainer groove 1012. The fabric retainer 1000 is generally symmetrical about a center line through the longitudinal section of the fabric retainer 1000, but need not be symmetrical. The fabric storage pockets 1014, the box sections 1052, and the chase 1026, may have their shapes altered to fit a particular application. For example, the outward extent of the retainer from the base wall 1002 may be varied to accommodate a varying cabling volume in the chase 1026, and to allow for the installation of varying thicknesses of acoustical material.

Retaining walls 1005 are disposed on either edge of the base wall 1002, and interior walls 1016 extend from the base wall 1002 on either side of the chase 1026. Each interior wall 1016 terminates in a forked end, one branch of the forked end being a fabric retaining arm 1010 which opposes an end portion 1007 of retaining wall 1005. An opposed fabric retaining arm 1010 and an end portion 1007 of a retaining wall 1005 form a fabric retaining portion 1001, which may preferably, but not necessarily, have retaining surfaces similar to those shown in FIG. 1.

The base wall 1002 may be provided with fastener locators 1070. This embodiment includes two box sections 1052 disposed on either side of the chase 1026 along with the respective fabric retaining pockets 1014. The inclusion of retainer grooves 1012 at either end of the fabric retainer 1000 permits retention of two separate sheets of fabric which extend in opposite directions, without having to insert the two sheets in the same fabric retaining pocket. Each interior wall 1016 of the fabric retainer 1000 includes a two-way locking portion 1021, with a locking lip 1023 and a locking lip 1022 disposed on opposite sides of the two-way locking portion 1021.

A chair molding face cover 1080 is mounted to the fabric retainer 1000. Chair molding face cover 1080 has a chair molding or chair railing cross section. The face 1085 of the cover 1080 may have any aesthetically pleasing design, such as one similar to those found on conventional chair molding members installed on wall surfaces. It is also desirable that a first edge 1087 and a second edge 1088 of the cover 1080 extend far enough so that they cover the retainer grooves 1012 on either end of the fabric retainer 1000. Locking projections 1081 on the chair molding face cover 1080 have locking lips 1083 which engage locking lips 1023 on the fabric retainer 1000. Chamfered or rounded surfaces 1082 can be provided on locking lips to facilitate engagement. The orientation of locking lips 1083 can be reversed so that they can engage the locking lips 1022 on the two-way locking portions 1021.

FIG. 11 is a cross-sectional view of the fabric retainer 1000 with a removable face cover 1140 covering the chase. The face cover 1140 has a generally flat configuration similar to the face cover illustrated in FIG. 4.

FIG. 12 is a cross-sectional view of a sixth embodiment of a fabric retainer according to the present invention. Fabric retainer 1200 has a chase 1226 which remains partially open. Rather than closing the chase opening with a removable face cover, as discussed above, a trough wall 1290 is provided which extends from a second wall 1224 towards an interior wall 1208. Wires may then be inserted into the chase 1226 and are retained by the trough wall 1290. Depending upon the expected orientation of the retainer 1200, it may be desirable for the trough wall 1290 to extend from the interior wall 1208 towards the second wall 1224, rather than from the second wall 1224.

FIGS. 7–12 show fabric retainers in which the first walls extend generally perpendicularly to the base walls. However, an inwardly sloping first wall, as discussed with reference to FIG. 6, could be employed in any of the embodiments of FIGS. 7–12.

The fabric retainer embodiments disclosed in this application can made from, for example, molded or extruded (continuously molded) plastic. One suitable method of fabrication is extrusion of ABS or vinyl. Another suitable method is molding of ABS or vinyl. Any thermoplastic material which can be formed in the required configurations is considered appropriate for fabricating the embodiments in this application. Also appropriate are fiber-reinforced plastics (frp) or glass reinforced plastics (grp). Fire resistant materials may also be used to protect wiring mounted within the chase in the event of fire. Also, the retainers may be manufactured in selected colors for aesthetic reasons. It is expressly stated here that these methods are not the only methods by which the retainer assembly can be made, nor are the stated materials the only materials from which the retainer assembly can be made.

The relative heights and depths of the retainer embodiments illustrated are intended as representative of desirable retainer dimensions. However, the manipulation of retainer dimensions is considered to be within the scope of this invention.

Figure 13A:
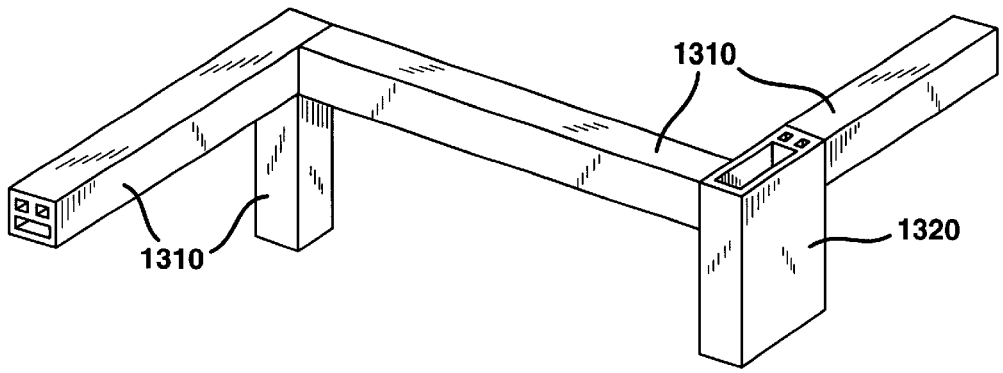
FIGS. 13(a)–(c) illustrate first through third systems of fabric retainers according to the present invention.
Figure 13B:
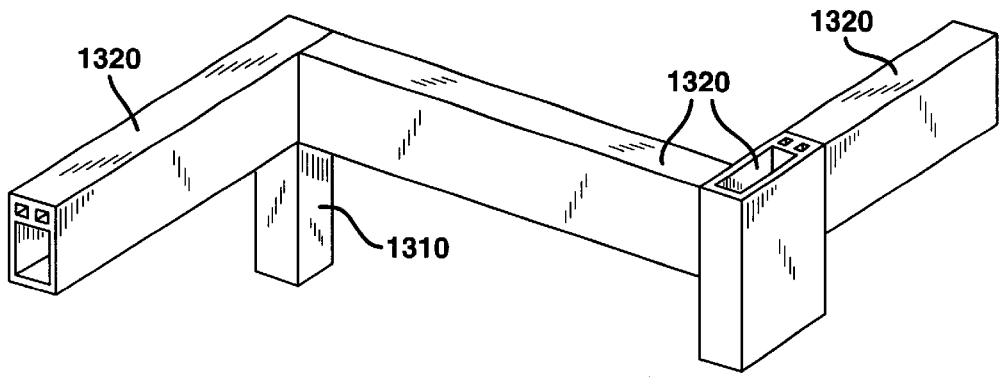
Figure 13C:
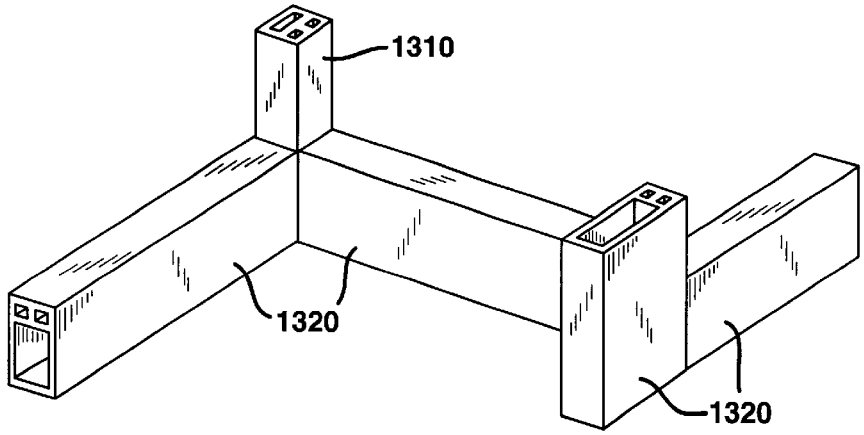

FIGS. 13(a)–13(c) illustrate various systems of combinations of fabric retainer members mounted on differing support surfaces. In particular, these figures demonstrate the advantages of mounting a combination of retainer members having larger chase sizes and smaller chase sizes at particular points within a room.

FIG. 13(a) shows a system of fabric retainer members including a larger chase fabric retainer member 1320 mounted at a vertical exterior corner. The remaining fabric retainer members are smaller chase fabric retainer members 1310, with chases which are smaller than the chase of fabric retainer member 1320. The use of fabric retainer members of different sizes offers many advantages over the use of a uniform fabric retainer type throughout a structure. As stated in the discussion of FIG. 3, the use of a larger chase fabric retainer member on an exterior corner allows for greater flexibility in selecting the width of the acoustical material applied to an adjacent wall surface. Also, the larger chase fabric retainer member 1320 can be used as a conduit for a larger volume of wires. Smaller chase fabric retainer members 1310 can be advantageously employed on interior corner surfaces, especially when the interior corners are easily accessible. In relatively inaccessible places, or areas where the installer may be precariously situated (e.g. on a high ladder), larger chase fabric retainer members 1320 can be employed for ease of installation.

FIG. 13(b) shows a system of fabric retainer members with a larger chase fabric retainer member 1320 mounted at a vertical exterior corner, and larger chase retainer members 1320 mounted along a top region of the system. Because of the relative ease of installation of the larger chase retainer members 1320, this system is particularly advantageous where the top region of the system is mounted very high on a wall, or in a relatively inaccessible location.

FIG. 13(c) shows a system of fabric retainer members with larger chase fabric retainer members 1320 mounted along a bottom region of the system. Larger chase fabric retainer members 1320 are desirable to mount along a floor due to their ease of installation.

Figure 14:
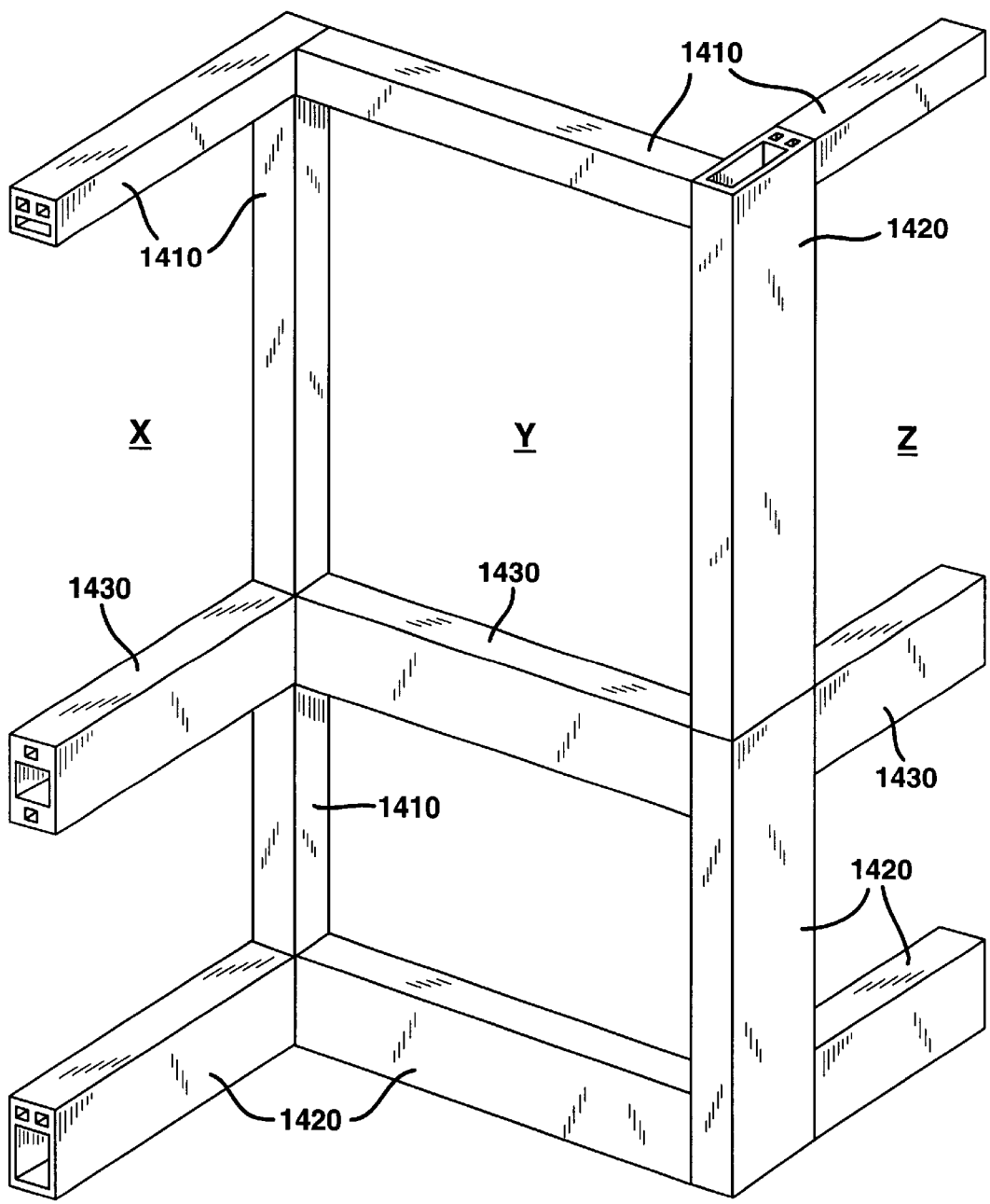
FIG. 14 illustrates a fourth fabric retainer system according to the present invention.

FIG. 14 shows a system of fabric retainer members including various embodiments disclosed in this application. In the figure, larger chase fabric retainer members 1420 are mounted on the exterior corner of intersecting walls Y and Z, and smaller chase fabric retainer members 1410 are mounted in the interior corner of intersecting walls X and Y. Smaller chase fabric retainer members 1410 are mounted near a ceiling of the structure (not shown), but larger chase fabric retainer members 1420 may be used if added ease in installation or greater wire capacity is desired. Larger chase fabric retainer members 1420 are mounted along the floor of the room, but smaller chase fabric retainer members 1410 may be utilized to save cost, or if size restrictions require a smaller fabric retainer member.

Fabric retainers members 1430 are mounted roughly midway along the vertical extent of the wall. Fabric retainer members 1430 may be of any configuration disclosed in this application, but may advantageously be of the type shown in FIGS. 10 and 11. Fabric retainer 1000 is particularly suited for use in a mediate location along the vertical extent of the walls, because fabric can be extended from both sides of the retainer.

Once the various retainer members are mounted within the room, and wiring is installed in the retainer member chases, removable face covers can be mounted onto the retainer locking portions of each fabric retainer member. For example, crown molding face covers 780 can be installed along the periphery of the ceiling, chair molding face covers 1080 can be installed along the intermediate row of retainers 1430, and baseboard molding face covers 880 can be installed along the bottom row of fabric retainer members.

Wire can be run from the chases of the vertically extending fabric retainer members in FIG. 14 through ports in the first wall of the vertically extending retainer members. Alternatively, if the fabric retainer members do not include ports or knockouts, the installer may simply form holes in the first wall during installation. As stated previously, removable knockouts can be included in the first walls of the fabric retainer members, and a second set of ports or knockouts can be included within the interior wall, allowing access from the box section into the chase. Therefore, wires may be freely run between vertically and horizontally extending fabric retainer members of any embodiment shown in this application.

Figure 15:
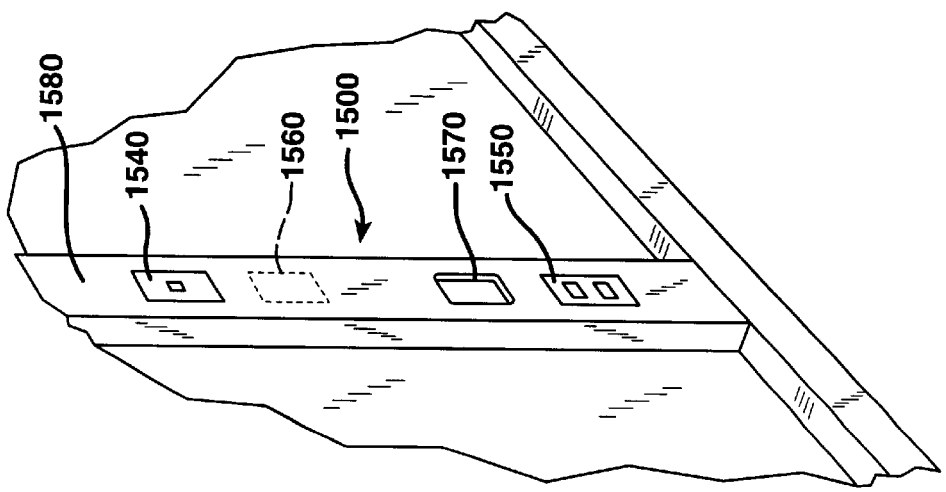
FIG. 15 illustrates a fifth fabric retainer system according to the present invention.
Figure 17:
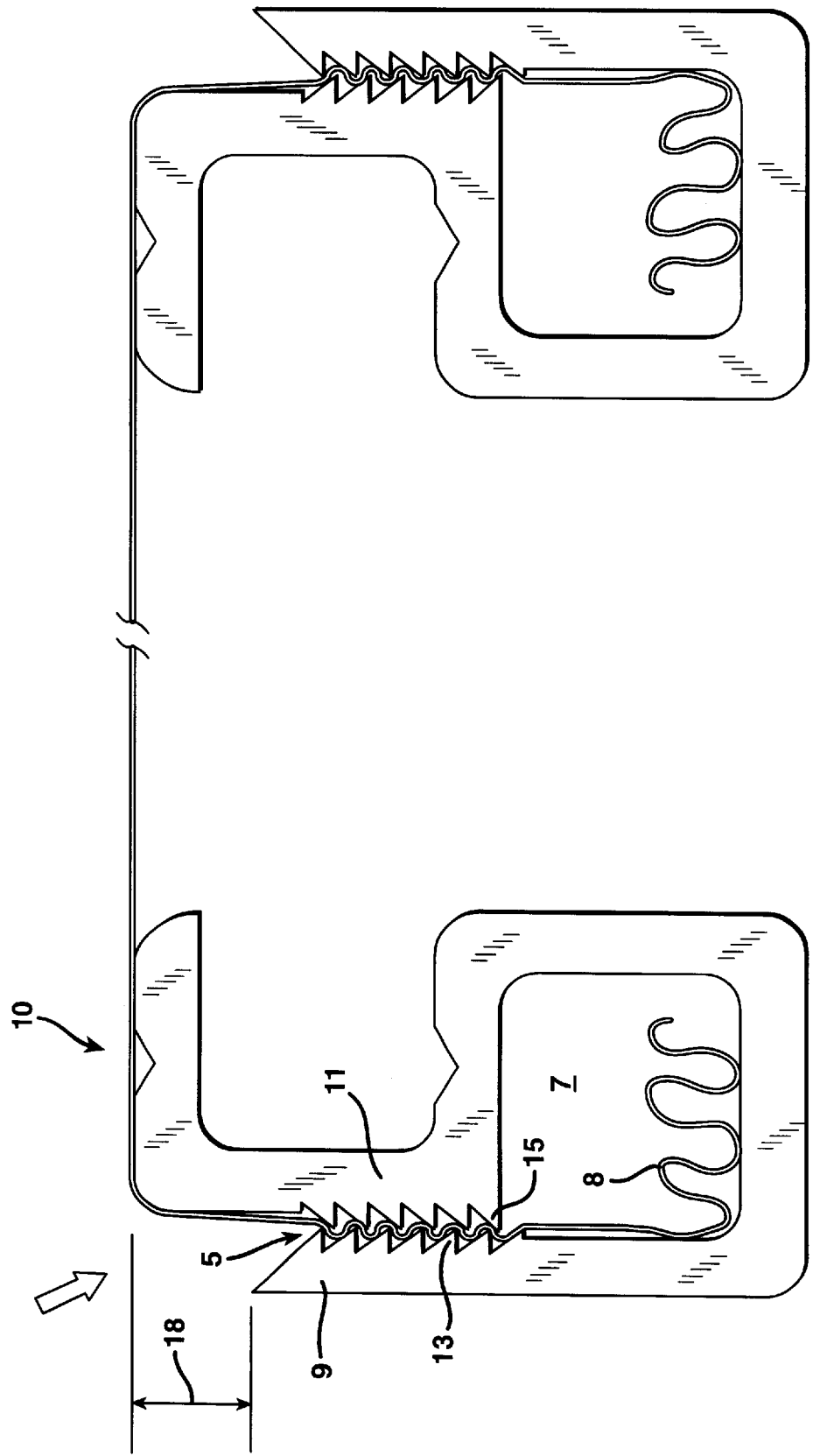
FIG. 17 is a cross-sectional view of a conventional fabric retainer.
Figure 18:
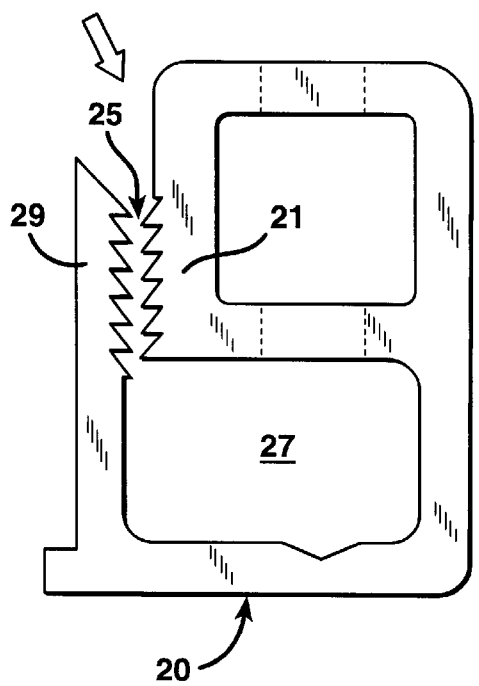
FIGS. 18 and 19 are cross-sectional and plan views of a conventional fabric retainer.
Figure 19:

FIG. 15 shows a system of fabric retainer members having receptacles included within a fabric retainer member 1500. In this arrangement, the retainer member or series of retainer members provides wire and cable access to the point of use at receptacles 1540 and 1550. Examples of receptacles which could be mounted within the retainer member 1500 include speaker controls or jacks, cable outlets, power supply outlets, telephone outlets, security system ports, or intercom system outlets. Retainer member 1500 can be of the general configuration of any of the retainer embodiments discussed in this application. The retainer member 1500 can be concealed by stretching fabric over the surface of the retainer member.

If the retainer member 1500 is to be used as a power outlet, the width and depth of the chase can be sized so that an outlet box can be inserted into the chase through an aperture in the face cover. An aperture 1570 may be prefabricated prior to installation, or receptacle knockouts 1560 can be stamped into the surface of the removable face cover 1580. Alternatively, the installer may simply form receptacle holes during installation. Prefabricated face covers can be manufactured which include pre-cut apertures or knockout patterns stamped in the face cover. FIG. 15 shows receptacles mounted on a vertically extending retainer member 1500, but the fabric retainer shown in FIGS. 10 and 11, which includes two retainer grooves 1012, may also be used to provide receptacles at a preferred height along a wall. This is especially advantageous when the receptacles are all desired to be at a uniform height along a wall. Retainers 1000 can be arranged in a horizontal orientation about the periphery of a structure and provide a mounting surface for the various jacks or outlets within the room.

Figure 16:
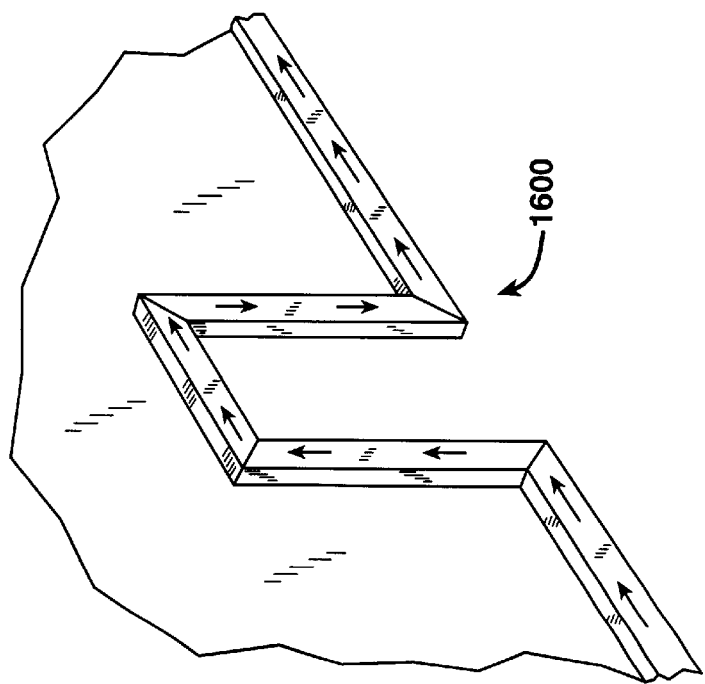
FIG. 16 illustrates a fabric retainer system having retainer members arranged around a rectangular obstacle along a support surface.

FIG. 16 shows how a fabric retainer system 1600 can provide continuous access around a doorway for power, communication, etc. Any retainer disclosed in this application may be installed in this manner. The individual retainer members are cut at a 45 degree angle and retainer member ends are mated at the door corners. A door is shown as traversed in this figure, but retainer members could also be mounted around windows or any other irregularity in a wall.

Figure 20:
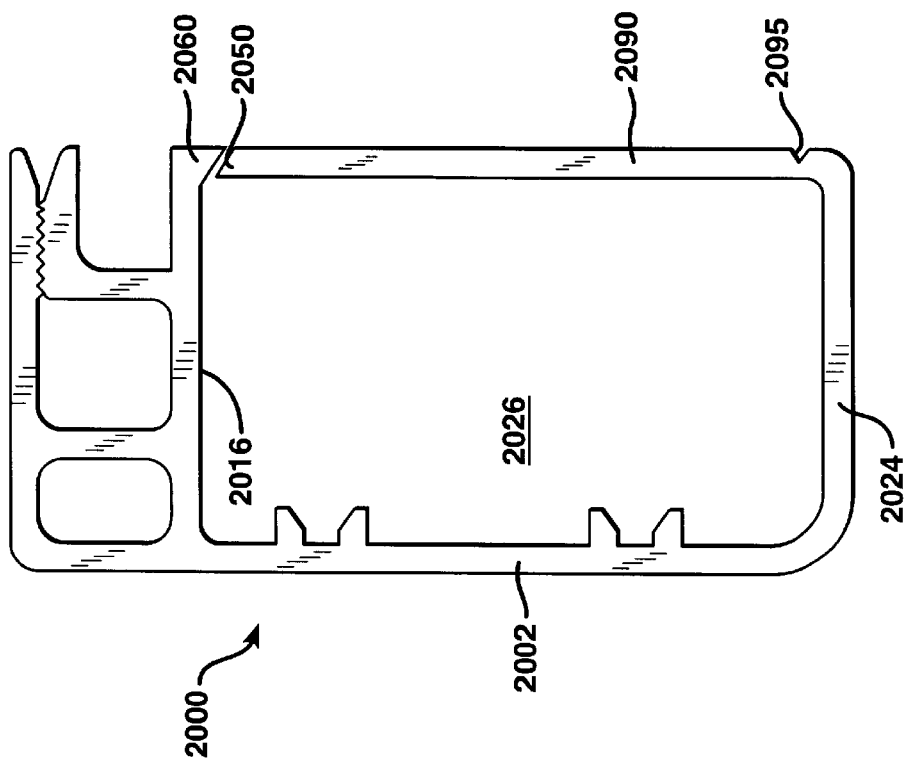
FIG. 20 is a cross-sectional view of a fabric retainer according a seventh embodiment of the present invention.

FIG. 20 is a cross-sectional view of a seventh embodiment according to the present invention. Fabric retainer 2000 has a pivotable wall 2090 which selectively closes a selectively open side of a chase 2026. Pivotable wall 2090 is pivotable about a frictionless hinge 2095, which is shown as near the intersection of a second wall 2024 and the pivotable wall 2090 by way of example, but can be located elsewhere on the pivotable wall 2090. The selectively open side of the chase 2026 is opened by applying a force to pivot the pivotable wall 2090 about frictionless hinge 2095, outward from the chase 2026. When the pivotable wall 2090 is pivoted outward from the chase 2026, fasteners can be driven through a base wall 2002, and wires can be inserted into the chase 2026. When the pivoting force is released, the pivotable wall 2090 resiliently springs back towards the chase 2026. The chase 2026 is closed by pressing the pivotable wall 2090 against a locking tab 2060 which extends from an interior wall 2016. The locking tab 2060 yields resiliently, allowing a beveled edge 2050 of the pivotable wall 2090 to enter the chase 2026. The pivotable wall 2090 can alternatively extend from the interior wall 2016, and engage a locking tab on second wall 2024.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fabric retainer comprising:
    a base wall;
    a first wall extending from the base wall wherein a distal edge of the first wall includes a first fabric retaining surface;
    a second wall extending from the base wall generally in the same direction as the first wall;
    an interior wall extending from the base wall between the first wall and the second wall wherein a distal edge of the interior wall includes a fabric retaining arm with a second fabric retaining surface, opposing the first fabric retaining surface; and
    a fabric retaining portion for grippingly retaining a fabric portion wherein said fabric retaining portion comprises the opposing first and second fabric retaining surfaces.

2. A fabric retainer according to claim 1, wherein a chase is disposed between the interior wall and the second wall, the chase having an open side.

3. A fabric retainer according to claim 2 wherein the distal edge of the interior wall comprises a forked end, wherein one branch of the forked end is a first locking portion, and the other branch of the forked end is the fabric retaining arm.

4. A fabric retainer according to claim 2, wherein the first and second fabric retaining surfaces include respective pluralities of engageable fabric retaining teeth.

5. A fabric retainer according to claim 2, further comprising a face cover, the face cover being engageable with the fabric retainer to at least partly close the open side of the chase.

6. A fabric retainer according to claim 1, further comprising a box rib extending between the first wall and the interior wall, whereby the interior wall, the base wall, the first wall, and the box rib define a box section.

7. A fabric retainer according to claim 2, wherein a first locking portion extends from the interior wall, and the second wall includes a second locking portion, a space between the second locking portion and the first locking portion defining the open side of the chase.

8. A fabric retainer according to claim 7, wherein the first and second locking portions each include at least one locking lip.

9. A fabric retainer according to claim 8, wherein the first and second locking portions each include first and second locking lips located on opposed sides of each locking portion.

10. A fabric retainer according to claim 9, further comprising a face cover, the face cover being engageable with the first and second locking portions to at least partly close the open side of the chase.

11. A fabric retainer according to claim 5, wherein the face cover includes
    at least one locking projection for engaging the face cover with the retainer.

12. A fabric retainer according to claim 5, wherein the face cover has one of a crown molding cross section, a baseboard molding cross section, and a chair molding cross section.

13. A fabric retainer according to claim 1, wherein the interior wall, the second wall, and the first wall are all substantially perpendicular to the base wall.

14. A fabric retainer according to claim 1, wherein a fabric storage pocket is defined between the first wall and the interior wall.

15. A fabric retainer comprising:
    an elongate member including:
        a first fabric retaining portion;
        a chase having an opening on a side of the elongate member; and
        a second fabric retaining portion, wherein the fabric retaining portions are located on opposite sides of the chase.

16. A fabric retainer according to claim 15, further comprising a face cover, the cover being engageable with the elongate member to at least partly close the chase opening.

17. A fabric retainer according to claim 15, wherein the elongate member further includes:
    a first wall having an end portion;
    an interior wall; and
    a fabric retaining arm extending from the interior wall; wherein
        the fabric retaining arm and the end portion of the first wall are opposed to one another, and comprise the fabric retaining portion.

18. A fabric retainer according to claim 15, wherein the elongate member further includes:
    a base wall;
    an interior wall extending from the base wall; and
    a second wall spaced from the interior wall;
    wherein the interior wall, the second wall, and the base wall define the chase.

19. A method for covering a support structure with fabric comprising:
    providing at least one retainer member including:
        a base wall comprising:
            a first wall extending from the base wall wherein a distal edge of the first wall includes a first fabric retaining surface;
            a second wall extending from the base wall generally in the same direction as the first wall;
            an interior wall extending from the base wall between the first wall and the second wall wherein a distal edge of the interior wall includes a fabric retaining arm with a second fabric retaining surface, opposing the first fabric retaining surface; and a fabric retaining portion for grippingly retaining a fabric portion wherein said fabric retaining portion comprises the opposing first and second fabric retaining surfaces; and a chase for housing wires;

mounting the at least one retainer member on a support surface;

inserting fabric into the fabric retaining portion of the at least one retainer member;

inserting wires into the chase of the at least one retainer member; and placing a cover over an opening of the chase.

20. A method for covering a support structure with fabric comprising:

providing at least one retainer member of a first type having a first cross-sectional size, and a fabric retaining portion;

providing at least one retainer member of a second type having a second cross-sectional size, and a fabric retaining portion;

mounting the at least one retainer member of said first type on the support structure;

mounting the at least one retainer member of said second type on the support structure; and engaging fabric with the fabric retaining portion of at least one of said at least one retainer member of the first type and said at least one retainer member of the second type.

21. The method of claim 20, wherein the at least one retainer of the first type includes a chase, and the at least one retainer member of the second type includes a chase which is larger in cross-section than the chase of the at least one retainer member of the first type.

22. The method of claim 20, wherein mounting at least one retainer member of a first type on a support structure includes mounting a retainer member of the first type on an exterior corner of the structure; and mounting the at least one retainer member of a second type on a support structure includes installing a retainer member of the second type on an interior corner of the structure.

23. The method of claim 20, further comprising:

providing a first face cover;

engaging the first face cover with the at least one retainer member of the first type;

providing a second face cover; and engaging the second face cover with the at least one retainer member of the second type.

24. The method of claim 20, further comprising:

providing at least one retainer member of a third type, the retainer member of the third type including a chase, and a plurality of fabric retaining portions; and mounting the retainer member of said third type on the support structure.

25. The fabric retainer according to claim 2, wherein a chase is disposed between the interior wall and the second wall, the chase having a selectively open side.

26. The fabric retainer according to claim 25, further comprising:

a pivotable wall, the pivatable wall being pivotable about a hinge to at least partly close the selectively open side of the chase.

27. The fabric retainer according to claim 5, wherein the face cover includes at least one aperture for mounting a receptacle.

28. The fabric retainer according to claim 16, wherein the face cover includes at least one aperture for mounting a receptacle.

29. The method according to claim 20, wherein the fabric is decorative.

* * * * *